May 23, 1944.  B. F. LANGER  2,349,663
TORSIONAL MEASURING DEVICE
Filed April 17, 1942

WITNESSES:
Edward Michaels
[signature]

INVENTOR
Bernard F. Langer.
BY
Paul E. Friedemann
ATTORNEY

Patented May 23, 1944

2,349,663

UNITED STATES PATENT OFFICE 2,349,663

TORSIONAL MEASURING DEVICE

Bernard F. Langer, Pittsburgh, Pa., assignor to Westinghouse Electric & Manufacturing Company, East Pittsburgh, Pa., a corporation of Pennsylvania Application April 17, 1942, Serial No. 439,335

5 Claims. (Cl. 265—25)

My invention relates to torsiometers which are particularly useful in measuring the twist along a shaft or shaft system and, more particularly, in measuring the torque transmitted to an airplane propeller.

This invention is, in part, an improvement over Langer and Osbon application Serial No. 408,050, filed August 23, 1941, assigned to the assignee of this application.

Said Langer and Osbon application embodies, broadly, two generators one at the power end of a shaft system and the other at the delivery or propeller end of the power system. The twist or elasticity, and, therefore, the torque transmitted through the system is then represented by the phase difference between voltages produced by the two generators.

It is an object of my invention to provide an improved means of measuring the phase angle between the two voltages and, in this instance, to measure said difference as torque delivered to the airplane propeller or the horsepower output of the engine driving the propeller.

Another object of my invention is to provide an improved light-weight torsional metering system having a greater accuracy over a wide range of shaft speeds and operating temperatures.

A further object of my invention is to provide an improved circuit which will tend to eliminate any error due to an accidental change in the voltage of one of the generators.

Other objects of my invention will either be pointed out specifically in the course of the following description of one form of a system embodying my invention, or will be apparent from such description, in which.

Figure 1:
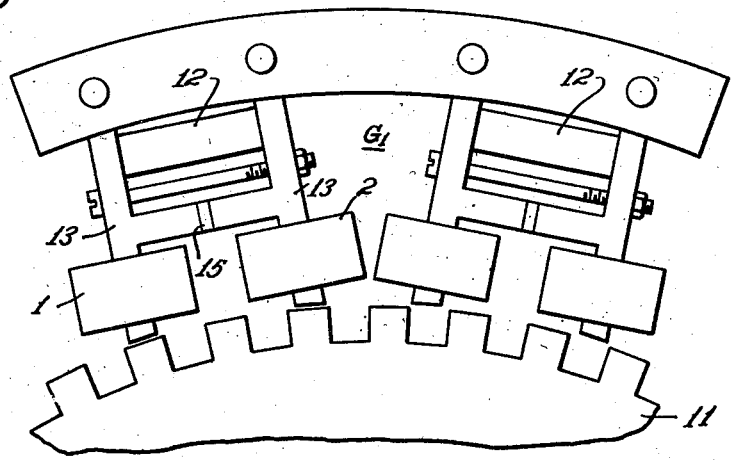
Figure 1 is a front partial view of a generator or pickup unit.
Figure 2:
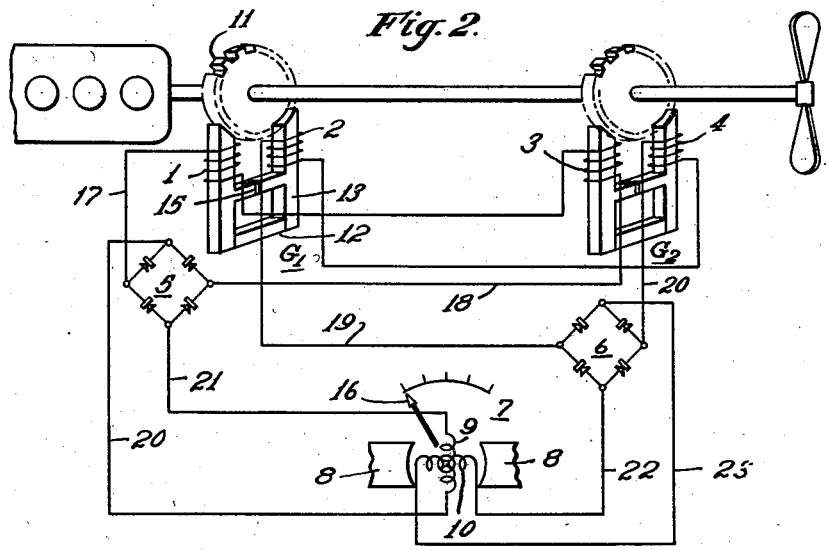
Fig. 2 is a schematic drawing illustrating a propeller drive shaft having associated therewith the torsional measuring device embodying my invention.

Fig. 1 shows one, namely $G_1$, of the two generators utilized in my torsional measuring device, say, for example, the one located relatively near to the power device. This generator is positioned close to a toothed disk or wheel 11 which is attached to the drive shaft or shaft system. The generators embody an iron pickup structure comprising a permanent magnet 12 and laminated or solid soft iron cores 13 which extend close to the rotating disks 11. A leakage path including an air gap or non-metallic spacer 15 is provided to reduce the variation of flux in the permanent magnet and to increase the life of said magnet. Voltage generating coils 1 and 2 are mounted on the iron core of generator $G_1$ in such a way that as the flux changes due to the passage of teeth of disk 11 past the pole tips, a voltage is generated in said coils.

Generator $G_2$ is similar to generator $G_1$ except that the voltage generating coils thereof are designated by the numerals 3 and 4. In addition, the frequency of said generators are equal, inasmuch as the disks 11 have equal numbers of teeth.

It will be noted that the generators $G_1$ and $G_2$ have a second pickup unit in cooperation therewith. These additional units are utilized to eliminate objectionable even voltage harmonics by connecting the coils thereof in an additive arrangement with the coils of the main generator pickups. This insures that the voltage harmonics generated by the two coils are in phase opposition, whereby the harmonics generated thereby cancel out. The third harmonics and its multiples are eliminated by making the peripheral pole width of the generators equal to one-third of the tooth pitch of the disk 11. Accordingly, by eliminating the second and third harmonics and their multiples, a single phase generator is provided which has substantially a pure sine wave form.

Figure 3:
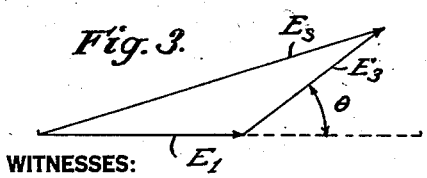
Figs. 3 and 4 are vector diagrams showing voltages generated in the various coils of the generators.
Figure 4:
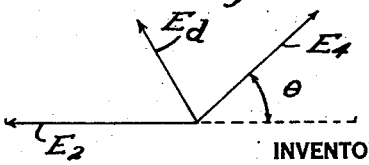

The corresponding coils of the generators $G_1$ and $G_2$ are, in this instance, designed so that the voltages generated thereby are equal. Accordingly, $E_1 = E_3$, and $E_2 = E_4$. Coil 1 of generator $G_1$ is connected in series with the corresponding coil 3 of generator $G_2$ so as to be additive. These coils are then connected to a rectifier 5 by suitable circuit means 17 and 18. The corresponding coil 2 of generator $G_1$ and coil 4 of generator $G_2$ are connected in series, in a subtractive manner, to a second rectifier 6 by means of suitable circuit means 19 and 20. Accordingly, the vector sum $E_s$ of the voltages $E_1$ and $E_3$ is impressed across the rectifier 5, while the vector difference $E_d$ is impressed across rectifier 6. The voltage $E_s$ is illustrated in Fig. 3, while the voltage $E_d$ is illustrated in Fig. 4.

A ratio type direct-current indicating instrument 7 is utilized to measure the amount of torsion in the shaft or shaft system between the two generators $G_1$ and $G_2$. This instrument embodies stationary permanent magnets 8, two movable coils 9 and 10, and a suitable indicating device 16. The coils 9 and 10 are mechanically connected together and to the indicating device 16. However, said coils are electrically independent of each other. The coils 9 and 10 and indicating device 16 move independent of any mechanical restraining device, such as a spring. One of the coils 9 is connected to rectifier 5 by suitable circuit means 20 and 21 and is energized by the rectified voltage $E_s$. Coil 10 is connected to the rectifier 6 by suitable circuit means 22 and 23 and is energized by the voltage $E_d$. The position of the indicating means is then dependent upon the ratio between the currents in the two coils 9 and 10, which varies directly with the change of the torsion of the rotating shaft or shaft system.

If $\theta$ is the phase angle between the two generators, or, in other words, the amount of torsion between the generators $G_1$ and $G_2$, then since $E_1=E_3$ and $E_2=E_4$, $$E_s = \sqrt{2E_1^2 - 2E_1^2 \cos(180° - \theta)} = 2E_1 \cos \frac{\theta}{2}$$

and $$E_d = \sqrt{2E_2^2 - 2E_2^2 \cos \theta} = 2E_2 \sin \frac{\theta}{2}$$

The position of the pointer on the ratio instrument is determined by $E_d/E_s$ which equals $$\frac{E_2}{E_1} \tan \frac{\theta}{2}$$

Since $$\frac{E_2}{E_1}$$

is a constant of the generator, the reading is determined only by the phase angle $\theta$ of the two voltages and is independent of their absolute magnitudes. Thus the torque reading is independent of the speed of rotation of the shaft.

A further advantage of my system will be noted upon an investigation of the error produced by an accidental change in the voltage of one of the generators. Suppose, for example, the generators are designed to make $E=E$, then suppose that $E_2$ increases 10%, at $\theta=45°$, we find that $E_d$ has increased 6%, whereas $$\frac{E_d}{E_s}$$

has increased only 1½%. Accordingly, the error due to the accidental change in voltage has been reduced to substantially one-fourth of its previous value.

It is, therefore, obvious that I have provided an improved system for measuring the torsional movements in a driven shaft or shaft system which is independent of the speed of rotation of the shaft and of the magnitude of voltages generated by the pickup generators.

Various modifications may be made in the system embodying my invention without departing from the spirit and scope thereof, and I desire, therefore, that only such limitations shall be placed thereon as are imposed by the prior art and the appended claims.

I claim as my invention:

1. In a system for measuring torsional movements in a driven shaft having a pair of generators operatively connected to the shaft so as to change their phase relationship when torsional movements of the shaft exist, the combination of, a first and a second coil in each generator, a plurality of rectifiers, a ratio-type direct-current instrument having two moving coils, circuit means, including the first coil of one generator connected in an additive relation to the first coil of the second generator, connected to one instrument coil through one of said rectifiers, and second circuit means, including the second coil of one generator connected in subtractive relation to the second coil of the second generator, connected to the second instrument coil through another of said rectifiers, whereby a reading responsive to the torsional movements of the shaft is obtained independent of the magnitude of voltages generated and of the speed of rotation of the shaft.

2. In a torsional measuring system for a shaft having a pair of generators operatively connected to said shaft at two different portions thereof so as to be responsive to the relative rotative movements of said portions of the shaft, the combination of, a first and second coil in each generator, two rectifiers, an instrument having two moving coils adapted to produce an indication corresponding to the ratio of currents in the moving coils, circuit means for connecting the vector sum of the voltages of the first coil of each generator to one instrument coil through one of said rectifiers, and second circuit means for connecting the vector difference of the voltages of the second coil of each generator to the second instrument coil through the second rectifier, whereby the torsional movements of said shaft between said generators is obtained independent the speed of rotation of the shaft.

3. In a torsional measuring system for a shaft having a pair of generators operatively connected to said shaft at two different portions thereof so as to be responsive to the relative rotative movements of said portions of the shaft, the combination of, a first and second coil in each generator, two rectifiers, a ratio-type direct-current instrument having two mechanically connected electrically independent moving coils and two permanent magnet exciters, circuit means for connecting the vector sum of the voltages of the first coil of each generator to one instrument coil through one of said rectifiers, and second circuit means for connecting the vector difference of the voltages of the second coil of each generator to the second instrument coil through the second rectifier, whereby the torsional movements of said shaft between said generators is obtained independent the speed of rotation of the shaft.

4. Apparatus for measuring the torque of a rotating shaft comprising, in combination, two generators axially spaced and operatively connected to said shaft, the voltages generated by said generators being equal and of a magnitude proportional to the speed of said shaft, means for producing a resultant voltage which is the vectorial sum of a portion of the voltage output of each of said generators, means for producing a resultant voltage which is the vectorial difference of another portion of the voltage output of each of said generators, a meter having permanent magnet means for producing a magnetic field and a pair of mechanically connected crossed coils rotatably disposed in said magnetic field, said motor being adapted to produce an indication corresponding to the ratio of the currents in said crossed coils, and circuit means for connecting one of said means for producing a resultant voltage with one of said crossed coils and for connecting the other of said means for producing a resultant voltage with the other of said crossed coils whereby the ratio of said resultant voltages is measured.

5. Apparatus for measuring the torque of a rotating shaft comprising, in combination, a generator responsive to the speed of rotation of one portion of said shaft, a second generator responsive to the speed of rotation of another portion of said shaft, coil means included in each of said generators, each of said coil means having equal voltages generated therein, first circuit means interconnecting a portion of the coil means of each of said generators for producing a resultant voltage which is the vectorial sum of the generated voltages, second circuit means interconnecting another portion of the coil means of each of said generators for producing a voltage which is the vectorial difference of the generated voltages, a meter having permanent magnet means for producing a magnetic field and a pair of mechanically connected crossed coils rotatably disposed in said magnetic field, said meter being adapted to produce an indication corresponding to the ratio of the currents in said crossed coils, a circuit including a rectifier for connecting said first circuit means to one of said crossed coils and a circuit including a rectifier for connecting said second circuit means to the other of said crossed coils whereby the ratio of said resultant voltages is measured.

BERNARD F. LANGER.